United States Patent Office 3,345,442
Patented Oct. 3, 1967

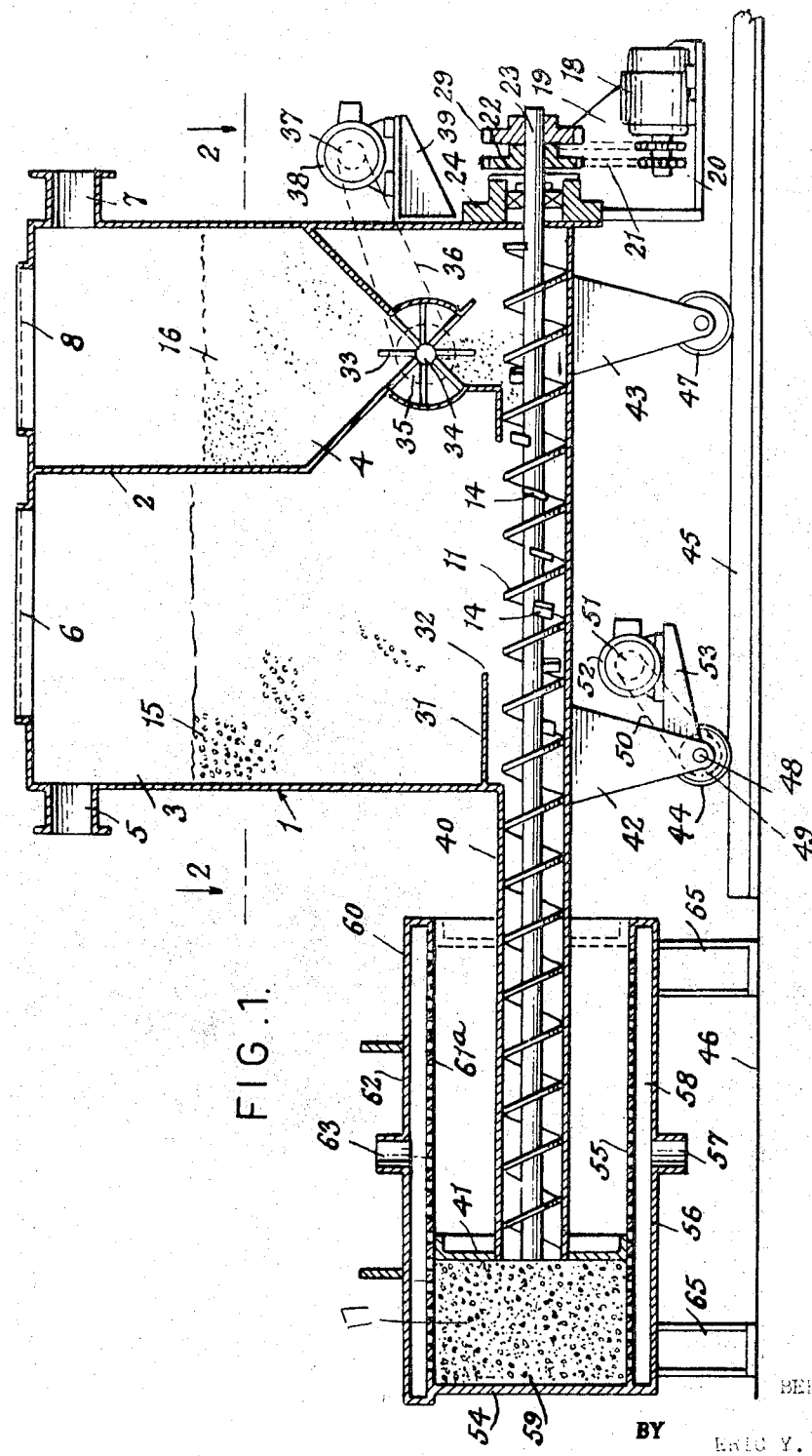

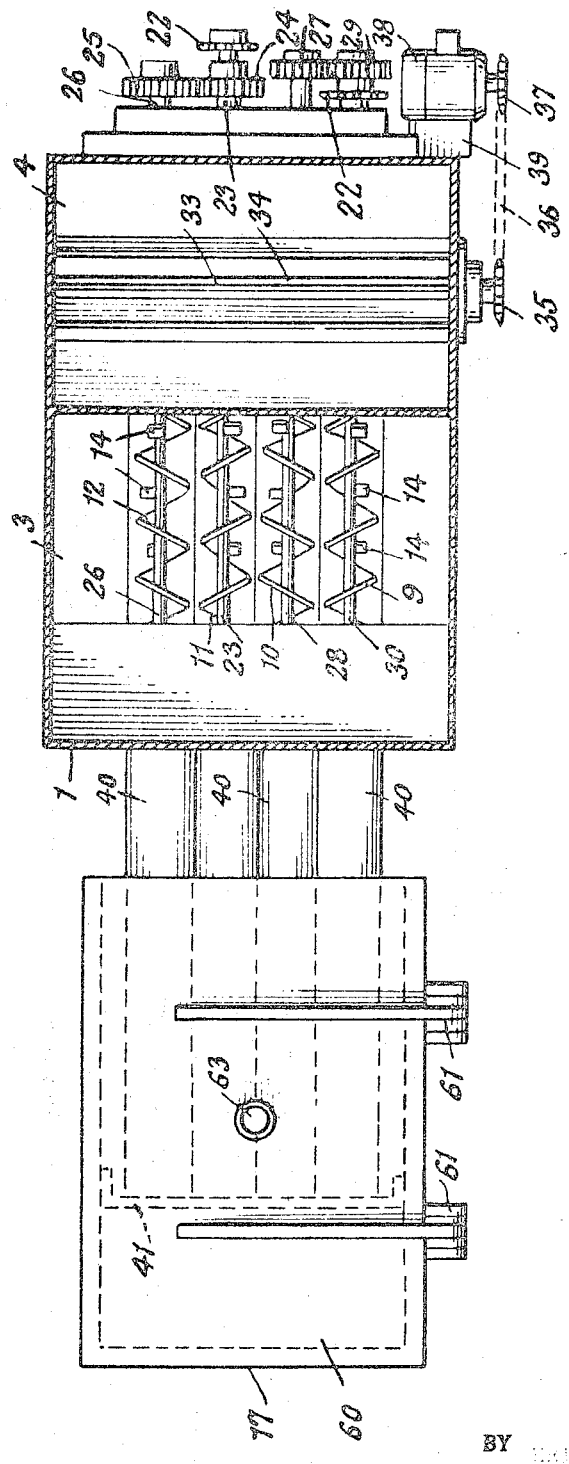

3,345,442
METHOD OF MOLDING SHEET MATERIAL FROM A UNIFORM MIXTURE OF PRE-EXPANDED THERMOPLASTIC PARTICLES AND A SOLID PARTICULATE ADDITIVE
Berton Oxel, New Castle, Pa., assignor to Dyfoam Corporation, New Castle, Pa., a corporation of Pennsylvania
Original application Nov. 9, 1961, Ser. No. 151,368, now Patent No. 3,164,860, dated Jan. 12, 1965. Divided and this application Sept. 30, 1964, Ser. No. 400,338
4 Claims. (Cl. 264—51)

This is a division of application Ser. No. 151,368, filed Nov. 9, 1961, now Patent No. 3,164,860.

This invention relates to a method for uniformly mixing substances of different densities and/or different particle size for making sheet and other material useful for many purposes, such as insulation, and to an improved product composed of a synthetic thermoplastic, such as expandable polystyrene beads combined with other material, such as polyurethane and also with particulate substances, such as vermiculite, perlite or other mineral substances, such as aluminum slivers, glass fibers, asbestos fibers and wood fibers, and even liquid substances such as rubbery thermoplastic material dissolved in a solvent that will not affect the particles mixed.

Expanded polystyrene and other similar thermoplastic materials are employed for many useful purposes, but when used alone and without the addition of some sort of binding or supporting material, its tendency to crumble or disintegrate often becomes evident, particularly at high temperatures. It is therefore desirable, for some purposes and particularly when the expanded polystyrene or other similar thermoplastic materials are used in the production of a board or sheet, that there be mixed with it some additional and usually heavier material, which will have such characteristics as to enable it to provide tenacity and body, thereby tending to hold the expanded polystyrene or other thermoplastic beads together in a manner to retard crumbling and provide a mixture of strength and durability.

It is therefore one of the objects of the present invention to provide a method by which pre-expanded synthetic thermoplastic material such as polystyrene beads, and materials of different densities and/or different particle size, such as vermiculite, perlite and other mineral as well as metal substances and plastic substances in liquid form will be thoroughly mixed or blended together and can be conveyed directly by the mixing or blending means into a molding section wherein the mixed material will be subjected to heat and controlled and regulated pressure, resulting in further expansion of the pre-expanded polystyrene beads or similar thermoplastic material, and in the consolidation of the ingredients of the mixture.

It is another object of the invention to provide a method of making a mixture of pre-expanded synthetic thermoplastic material with a heavier material in granular form, such as for example, vermiculite, with the granules of such heavier material thoroughly mixed with the thermoplastic and substantially uniformly distributed throughout the mixture, and in molding the mixture so produced with the assurance that the molded product will contain the same distribution of the particles of thermoplastic and vermiculite as was attained by the mixing step.

It is further an object of the invention to provide a process of mixing two materials of different densities and by which the normal tendency of the material of greater density to descend to the bottom of the mixing chamber will be greatly retarded, with the result that the mixture that is fed to the molding chamber or between molding belts, such as is suggested for example in co-pending application of Norrhede et al. Ser. No. 258,105 filed Feb. 4, 1963 and assigned to the assignee of the present application, will be one in which the heavier material will be uniformly distributed throughout the molded product.

It is still a further object of the invention to provide a molded product, composed of a mixture of synthetic thermoplastic, such as expanded polystyrene, and other material such as vermiculite, or other mineral substances, metal particles, as well as other heavier plastic materials and the like in granular or liquid form, in which the beads or particles of the thermoplastic will tend to be spaced or separated to a marked degree by the intervening other substances, thus being separated thereby and resulting in a structure of improved heat-resisting characteristics.

More particularly, the invention includes the provision of a mixing and feeding unit, including a multi-section hopper in which the different materials are separately contained; in spiral conveying means located below the hopper at the outlets of the same; of means for regulating the feeding of at least one of the materials to the conveying means; of elements provided on the spiral conveyors for assuring a complete mixture of the ingredients; of a heated mold chamber into which the mixture is deposited by the conveying means, the mold chamber including a movable mold wall that is operative to compress the material between it and a fixed mold wall, and in means for coupling the mixing and feeding unit to the movable mold wall, and in means for moving the mixing and feeding unit in a manner to permit of regulating the compression of the material in the mold chamber between the movable and fixed walls of the same. It should, of course, be understood that instead of moving the mixing and feeding units, the latter may remain stationary and the mold chamber may be moved relative to the mixing and feeding units.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a vertical sectional view of an apparatus constructed in accordance with the invention, and FIG. 2 is a horizontal sectional view, taken substantially on the line 2—2 of FIG. 1, looking in the direction of the arrows.

According to the present embodiment of the invention as disclosed in the drawings, the improved process contemplates the feeding of the different materials from two separate hopper compartments into a gang of spiral screw feeders or conveyors which not only feed these materials to the molding means, but which are provided with mixing elements on the shafts of the screw conveyors, serving to secure complete mixture of the materials and this despite the fact that one of the materials is heavier than the other and hence exhibits a tendency to descend to the bottom of the mixing chamber.

The materials thus thoroughly mixed as above stated are conveyed by the spiral or screw conveyors to a molding section, an example of which is disclosed at the left in both figures of the drawings, and in which the application of heat and pressure to the mixed material takes place.

The apparatus includes a hopper, generally indicated at 1, which is divided by a vertical partition 2, into the two chambers generally indicated respectively at 3 and 4. Chamber 3 contains the synthetic plastic material which may be pre-expanded polystyrene beads 15 or globules of, for example, a density of one pound per cubic foot. This chamber of the hopper is charged with the polystyrene through an inlet 5, through which the material can If desired, be airborne, permitting the material to drop down into the chamber 3, while the air escapes through the screen top 6 provided on the chamber 3.

The chamber 4 of the hopper receives the mineral or other particles hereinbefore mentioned, such as particles 16. These mineral or other particles are loaded into the chamber 4 through the inlet 7, through which this material can be airborne, the material falling down into the chamber 4, while the air escapes through the screen top 8.

Located at the lower end of the hopper 1 are four screw conveyors, indicated respectively at 9, 10, 11 and 12 in FIG. 2. It should be understood, however, that a lesser or greater number of screw conveyors may be used. Material discharged from the chambers 3 and 4 is received by these conveyors; is stirred or mixed by the mixing blades 14 provided on the shafts of the screw conveyors and is moved by the conveyors into a molding chamber 17.

The four screw conveyors are rotated by means of a variable-speed electric motor 18 mounted on a supporting bracket 19, said motor having its shaft provided with a double sprocket 20, engaged by a chain 21 extending to a sprocket 22 provided on a shaft 30 of the screw conveyor 9. Screw conveyor shaft 30 carries a gear 29 which is in mesh with and drives a gear 27 on the shaft 28 of the screw conveyor 10. Screw conveyors 11 and 12 are thus driven in opposite directions, but since these conveyors are of opposite thread, the feed of the material by both of them will be in the same direction or toward and into the molding chamber 17. Gear 24 is in mesh with and drives a gear 25 mounted on the shaft 26 of the screw conveyor 12 which is thus driven on the same direction as the screw conveyor 10. Gear 29 is in mesh with and drives a gear 27 on the shaft 28 of the screw conveyor 10 and thus rotatively drives said conveyor in the same direction as conveyor 9.

The bottom wall 31 of the chamber 3 of the hopper is apertured as shown at 32 so that the pre-expanded polystyrene beads or globules will be received by the screw conveyors and moved thereby toward the left as viewed in FIG. 1. Rotatively mounted in the lower outlet end of the chamber 4 is a paddlewheel feeder 33, the same extending across the lower end of the chamber 4 and having its shaft 34 provided with a sprocket 35 engaged by a drive chain 36, extending from a sprocket 37 provided on the shaft of a variable speed electric motor 38, mounted on a supporting bracket 39. This arrangement is such that by the speed of rotation of the paddlewheel feeder and the capacity of the pockets in the feeder, the proportion of the vermiculite or other material particles 16 to the polystyrene beads is regulatable. For example, 1 to 1½ lbs. per cubic foot of the pre-expanded polystyrene beads to 6 lbs. per cubic foot of the vermiculite, might be used.

The four screw conveyors 9 to 12 inclusive extend beyond the hopper 1 through tubes or sleeves 40 which extend into the interior of the mold chamber 17 and connect to and pass through a movable mold wall 41 closely fitting within the molding chamber 17 and movable as a piston within the same. To effect the axial movement of the mold wall 41 within the mold chamber 17, the mixing and feeding apparatus is made movable as a unit. For this purpose, the hopper 1 and the parts associated therewith are provided with legs 42 and 43, the legs 42 having wheels 44 supported on rails 45 mounted on a floor or other support 46. Wheels 47 are carried by axles in the legs 43 which wheels also ride on the rails 45.

The axle 48 on which the wheels 44 are mounted, carries a sprocket 49 engaged by a chain 50 extending over a sprocket 51 carried by the shaft of a variable speed motor 52 supported on the bracket 53. This arrangement is such that by the operation of the motor 52 the mold wall 41 can be moved from the dotted line position shown in FIG. 1 to any desired position with respect to the fixed end wall 54 provided on the mold chamber 17.

The mold chamber 17 is supported on the legs 65 and has an inner foraminous bottom wall 55 jacketed by an outer wall 56, with a steam inlet 57 communicating with the space 58 located between the walls and causing the steam to pass through the perforations in the inner wall 55 to reach and expand the mixed materials 59 contained in the mold chamber and under pressure by the movable mold wall 41. A cover member 60 is hinged at 61 to the top of the mold chamber, the cover having an inner foraminous wall 61$^a$ and an outer jacketing wall 62, the steam entering into the space between the walls 61$^a$ and 62 and reaching the mixed material 59 by passage through the openings in the wall 61$^a$.

From the foregoing, the operation of the improved apparatus and method will be readily understood.

The beads of the thermoplastic material such as those of pre-expanded polystyrene, are rounded and are usually of a diameter of approximately .1 to 6 mm. As a result, they roll readily and operate with very little friction against the blades of the screw conveyors. This friction is increased somewhat by the addition of the vermiculite. As the mixture is being conveyed by the screws, the friction between the material and the screw blades and the walls of the channels in which the blades operate is further increased and compression is produced. The maximum compression imposed on the mixture is, of course, produced in the mold chamber 17.

The beads of the thermoplastic material, such as pre-expanded polystyrene beads descend in the chamber 3 and discharge into the screw conveyors, where they mix with the particles of the other material, such as vermiculite, that are fed to the screw conveyors in regulatable quantity by means of the paddle-wheel feeder 33. The mixing blades 14 provided on the shafts of the several screw conveyors are effective to secure thorough mixing of the two different materials, and this despite the greater weight of the one of them, as such materials are being fed by the screw conveyors and into the mold chamber 17.

The mixed materials, thus moved and mixed by the screw conveyors, are forced thereby into the mold chamber and are compressed therein between the movable mold wall 41 and the fixed mold wall 54. The desired and regulatable compression in mold chamber 17 is produced by moving the mixing and conveying unit, as a whole, toward the left in FIG. 1 during the time the material is being fed by the conveyors into the mold chamber, until the required degree of pressure within the mold chamber is reached. Steam injected into the mold through foraminous walls 55 and 61$^a$ provides for heating and expansion of the mixture at a temperature of 100 to 120 degrees centigrade and results in an improved product.

Due to the fact that the conveyor screws tend to feed more of the mixed material than there is space for in the molding chamber, a pressure is built up therein which is exerted upon the conveyor screws. The amount of such pressure may be built up as desired and so as to accord with the feeding capacity possessed by the conveyor screws. The pressure employed is that which is most desirable for the particular product to be produced. The compression or pressure imposed on the material must at least rise to a degree such that it prevents the heavier ingredients from segregating and settling or sinking to the bottom of the mixture. If that were to occur, uniform board or sheet would not be obtained.

As previously mentioned, the compression is determined by the capacity of the conveyor screws as well as by the durability and strength of the molding chamber. By applying higher pressure, the volume per unit of weight is increased due to the fact that a larger amount of the material is fed into the molding chamber. This method results in the advantage that the volume per unit of weight can be varied to the desired extent.

At the location where the different materials are brought together, namely, below the outlets of the two hopper sections, the pressure is no higher than the weight of the materials themselves. Therefore, the mixing of the two materials must be thorough and that is attained by the described structure.

The degree of compression in the molding section can be observed through a manometer and when the compression reaches a point where its maintenance is to be constant, it can be maintained by the displacement of the feeding apparatus. The motor 52 of low speed serves to propel the entire feeding apparatus at the desired speed so that the compression recorded on the manometer can be maintained.

At the conclusion of the molding operation as above described, the material is allowed to cool and it is then removed from the mold and the next molding operation is carried out.

While it is herein suggested that the mixing and feeding apparatus herein described delivers its output of the mixed materials into a mold of the construction illustrated, it will be apparent that it can be used for the delivering the same to a mold for the production of material according to the above-mentioned co-pending application Ser. No. 258,105 or in association with other structures that result in continuous production of the product.

With respect to the liquid substance this can be an adhesive of the type which will set with or without heat after the particles have passed through the mixing screws. Rubber resin based materials dissolved in a solvent can be used as such adhesive. When being heated in the mold, the solvent will evaporate and the thermoplastic will adhere the mixed particles together. Such liquid could also be a vinyl plastisol dissolved in solvent. The liquid may also consist of thermo setting plastic such as a melamine-formaldehyde or phenol-formaldehyde composition.

The product produced by the apparatus and method herein described is one in which a uniform distribution of the vermiculite particles or other particles hreinbefore mentioned is had throughout the piece and in which such particles serve as spacing elements between the expanded thermoplastic beads, thus acting to separate and isolate them from one another. The thermal resistance of the vermiculite, for example, being more pronounced than that of the thermoplastic, a product more resistant to the transfer of heat than is the case when thermoplastic alone is used, is the result.

Having thus described a single embodiment of the invention, it is obvious that the same is not to be restricted thereto, but is broad enough to cover all structures coming within the scope of the annexed claims.

What I claim is:

1. In the method of molding sheet material from a mixture of beads of partially pre-expanded synthetic thermoplastic material and a solid particulate additive material of different density than that of said pre-expanded material, the improvement which comprises the steps of:
   (a) feeding a mass of said beads of partially pre-expanded material in a direction toward a molding zone;
   (b) introducing said solid particulate additive material into the mass of said pre-expanded material while the latter is being fed toward said zone;
   (c) uniformly mixing said pre-expanded material and said additive material while the same are being fed in said direction;
   (d) propelling said mixture through a confined passageway into said zone;
   (e) subjecting said mixture to heat and independently applied pressure in said zone to form the mixture into a foamed coherent body; and
   (f) maintaining said mixture, while being propelled through said passageway toward and into said zone, under a compressive force opposed to said body-forming pressure exerted in said molding zone, said compressive force being sufficient to prevent any substantial segregation and settling of said additive material from said mixture during movement of said mixture through said passageway.

2. The improvement defined in claim 1, wherein said mixture is propelled through a plurality of confined passageways and into said zone, said passageway being spaced from one another transversely of said direction.

3. The improvement defined in claim 1, wherein said additive material is a particulate mineral substance.

4. The improvement defined in claim 3, wherein said particulate material is vermiculite.

References Cited

UNITED STATES PATENTS

| | | | |
|---|---|---|---|
| 3,151 | 10/1868 | Boyle | 264—37 |
| 490,160 | 1/1893 | McGraw et al. | 264—328 |
| 1,183,427 | 5/1916 | Brown | 264—328 |
| 1,492,642 | 5/1924 | Lake | 264—329 |
| 1,560,368 | 11/1925 | Bartels et al. | 264— 329 XR |
| 1,598,201 | 8/1926 | Koppitz | 264—328 XR |
| 2,329,239 | 9/1943 | Banigan | 264—49 |
| 2,494,588 | 1/1950 | Skooglund | 18—12 |
| 2,590,757 | 3/1952 | Cornelius et al. | 264—124 XR |
| 2,787,809 | 4/1957 | Stastny | 264—53 |
| 2,806,254 | 9/1957 | Craig | 264—51 XR |
| 2,892,216 | 6/1959 | Steel | 264—46 XR |
| 2,951,260 | 9/1960 | Harrison et al. | 264—53 XR |
| 2,953,360 | 9/1960 | Kline | 259—9 |
| 2,958,905 | 11/1960 | Newberg et al. | 264—51 |
| 2,975,488 | 3/1961 | Brauner | 264—45 |
| 3,023,136 | 2/1962 | Himmelheber et al. | |
| 3,076,637 | 2/1963 | Moziek et al. | 18—12 XR |
| 3,088,713 | 5/1963 | Gard | 260—2.5 XR |
| 3,148,412 | 9/1964 | Spreeuwers | 18—12 |
| 3,168,291 | 2/1965 | Knoedler | 259—9 |
| 3,173,975 | 3/1965 | Wiles et al. | 264—51 |

FOREIGN PATENTS 2,105   1858   Great Britain.

OTHER REFERENCES

Lacey, P. M. C., "Developments in the theory of particle mixing," in J. of Applied Chemistry, May 1954, vol. 4, part 5, pp. 257–268.

Work, L. T., "Dry mixing of solids," in Chemical Engineering Progress, September 1954, vol. 50, No. 9, pp. 476–479.

Hoppe, Peter. "Lightweight materials and their uses." In Kungststoffe, vol. 42, No. 12, December 1952, pp. 450–459 (English translation).

Greathead, J. A. A., "Mixing patterns in Helical-flight dry-solids mixers," in Chemical Engineering Progress, April 1957, vol. 53, No. 4, pp. 194–198.

Coulson, J. M. "The mixing of solid particles," in Industrial Chemist, February 1950, vol. 26, No. 301, pp. 55–60.

ALEXANDER H. BRODMERKEL, *Primary Examiner.*

P. E. ANDERSON, *Assistant Examiner.*